(12) United States Patent
Kawabata et al.

(10) Patent No.: US 12,442,340 B2
(45) Date of Patent: Oct. 14, 2025

(54) ENGINE

(71) Applicant: Yanmar Holdings Co., Ltd., Osaka (JP)

(72) Inventors: Yuji Kawabata, Osaka (JP); Junichi Niimi, Osaka (JP); Katsunari Jonouchi, Osaka (JP); Masahiro Itani, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/386,140

(22) Filed: Nov. 1, 2023

(65) Prior Publication Data

US 2024/0141843 A1    May 2, 2024

(30) Foreign Application Priority Data

Nov. 1, 2022  (JP) .................................. 2022-175444

(51) Int. Cl.
*F02D 41/00* (2006.01)

(52) U.S. Cl.
CPC ..... *F02D 41/0052* (2013.01); *F02D 41/0077* (2013.01); *F02D 2200/0614* (2013.01); *F02D 2200/101* (2013.01)

(58) Field of Classification Search
CPC ............. F02D 41/0052; F02D 41/0077; F02D 2200/0614; F02D 2200/101; F02D 2200/0802; Y02T 10/40
USPC ....................................................... 123/445
See application file for complete search history.

(56) References Cited

U.S. PATENT DOCUMENTS

| | | | | |
|---|---|---|---|---|
| 10,184,410 | B2 | 1/2019 | De Filippo | |
| 2013/0086892 | A1* | 4/2013 | Ochi | F02M 26/15 60/278 |
| 2013/0232952 | A1* | 9/2013 | Zur Loye | F02D 13/0242 60/277 |
| 2016/0377006 | A1* | 12/2016 | De Filippo | F01N 3/035 60/274 |
| 2021/0115882 | A1* | 4/2021 | Itoh | F02D 41/22 |

FOREIGN PATENT DOCUMENTS

JP       2009-057849 A    3/2009

OTHER PUBLICATIONS

Extended European search report dated Apr. 3, 2024 issued in EP Application No. 23204082.4.

* cited by examiner

*Primary Examiner* — Yi-Kai Wang
(74) *Attorney, Agent, or Firm* — NORTON ROSE FULBRIGHT US LLP

(57) ABSTRACT

An engine includes a control unit that controls the EGR valve. The control unit selects a predetermined control mode from at least a first mode, a second mode, and a third mode according to at least an engine speed and a fuel injection amount, and controls the EGR valve in the selected control mode. The first mode is a control mode in which the EGR valve is fully closed. The second mode is a control mode in which the opening degree of the EGR valve is adjusted according to the operation state of the engine. The third mode is a control mode in which an ON period in which the opening degree of the EGR valve is adjusted according to the operation state of the engine and an OFF period in which the EGR valve is fully closed are repeated.

13 Claims, 8 Drawing Sheets

ENGINE

CROSS-REFERENCE TO RELATED APPLICATIONS

This application claims priority under 35 U.S.C. § 119 to JP Pat App. 2022-175444 filed Nov. 1, 2022. The entire disclosure of the application is hereby incorporated by reference.

TECHNICAL FIELD

The present invention relates to an engine including an exhaust gas recirculation (EGR) device.

BACKGROUND ART

In an engine including an EGR device, when the amount of foreign substances (e.g., soot called deposit) adhering to an EGR valve increases, proper operation of the engine is hindered. For this reason, for example, in an engine of Patent Literature 1, an estimation value of deposits adhering to the EGR valve is compared with a threshold, and in a case where the adhesion amount estimation value is equal to or greater than the threshold value, a control (EGR cut) of stopping recirculation of part of exhaust gas as EGR gas is performed.

PRIOR ART DOCUMENT

Patent Document

Patent Document 1: JP-A-2009-057849

SUMMARY OF INVENTION

Technical Problem

For example, in a case where the temperature of EGR gas is not so low that deposits are accumulated on the EGR valve, a risk of accumulating deposits on the EGR valve is assumed to be low. In the control of Patent Literature 1, even in a case where the risk of accumulating deposits on the EGR valve is low, the EGR cut is performed under a condition where the deposit adhesion amount estimation value is equal to or greater than the threshold. In this case, since EGR gas is not recirculated to an intake side, there is a concern that emission of NOx contained in exhaust gas to external environment (NOx emission) increases.

The present invention has been made to solve the above-described problem, and an object thereof is to provide an engine configured so that in a case where a risk of accumulating deposits on an EGR valve is low, the EGR valve is controlled to be opened as much as possible, and accordingly, emission of NOx contained in exhaust gas to external environment can be reduced as much as possible.

Solution to Problem

An engine according to one aspect of the present invention is an engine including an EGR device that recirculates part of exhaust gas discharged from a cylinder head as EGR gas to an intake pipe that supplies gas to the cylinder head, and
the EGR device includes an EGR valve that adjusts the recirculation amount of the EGR gas. The engine further includes a control unit that controls the EGR valve. The control unit selects a predetermined control mode from at least a first mode, a second mode, and a third mode according to at least an engine speed and a fuel injection amount, and controls the EGR valve in the selected control mode. The first mode is a control mode in which the EGR valve is fully closed. The second mode is a control mode in which the opening degree of the EGR valve is adjusted according to the operation state of the engine. The third mode is a control mode in which an ON period in which the opening degree of the EGR valve is adjusted according to the operation state of the engine and an OFF period in which the EGR valve is fully closed are repeated.

Advantageous Effects of Invention

In a case where a risk of accumulating deposits on an EGR valve is low, the EGR valve is controlled, by selecting, e.g., a third mode, to be opened as much as possible, and accordingly, emission of NOx contained in exhaust gas to external environment can be reduced as much as possible.

DESCRIPTION OF EMBODIMENTS

Embodiments of the present invention will be described below with reference to the drawings.

[1. Configuration of Engine]

Figure 1:
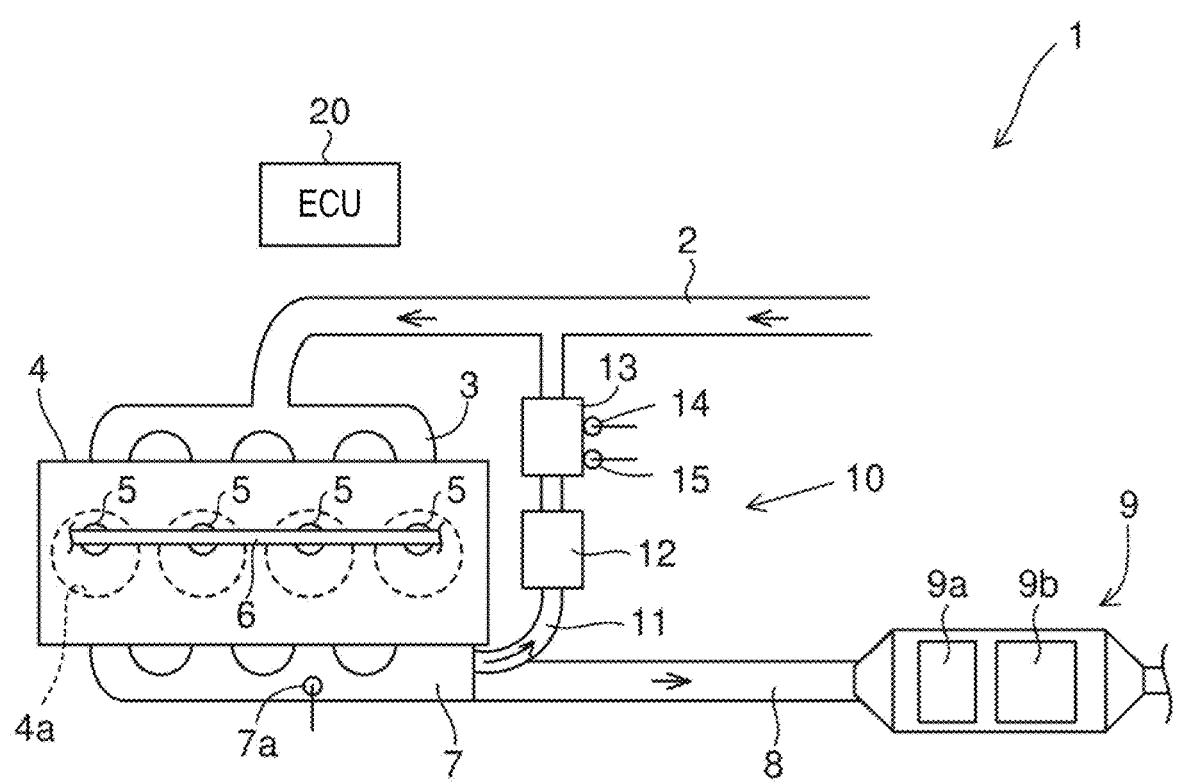
FIG. 1 is a schematic view describing the outline configuration of an engine according to one embodiment of the present invention.
Figure 2:
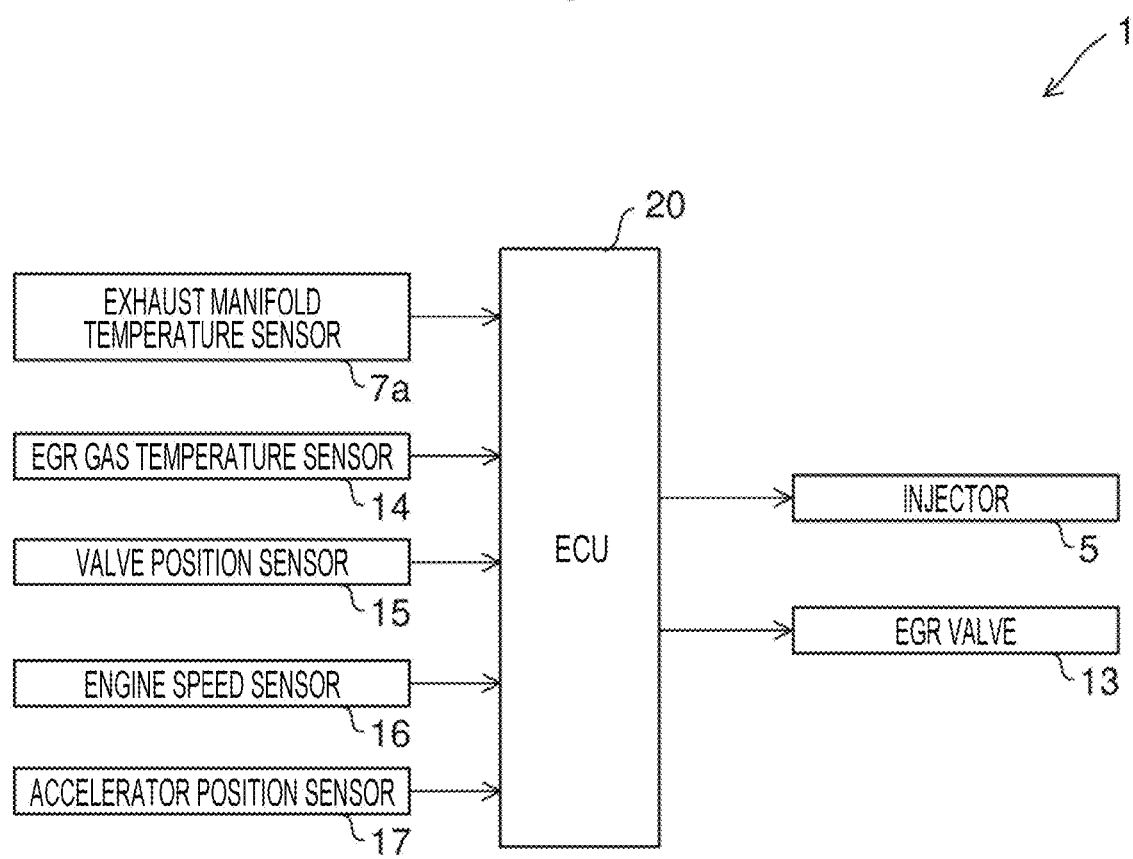
FIG. 2 is a block diagram showing the configuration of a main portion of the engine.

Hereinafter, the configuration of an engine of the present embodiment will be described. FIG. 1 is a schematic view describing the configuration of an engine 1 of the present embodiment. FIG. 2 is a block diagram showing the configuration of a main portion of the engine 1. The engine 1 is, for example, a diesel engine, and is mounted on, e.g., a work vehicle (work machine), an agricultural machine, or a ship.

The engine 1 includes an intake pipe 2 and an intake manifold 3 as members of an intake system. The intake pipe 2 sucks gas from the outside, and supplies the gas to the intake manifold 3.

The intake manifold 3 divides the gas supplied from the intake pipe 2 into a number (e.g., four in FIG. 1) corresponding to the number of cylinders, and supplies the gas to a cylinder head 4. The cylinder head 4 has a cylinder head cover (not shown) covering each cylinder, and injectors 5 (fuel injection devices) provided corresponding to combustion chambers 4a of the cylinders. The injector 5 injects fuel stored at a high pressure in a common rail 6 into the combustion chamber 4a of each cylinder at predetermined timing. Each cylinder is provided with a piston which reciprocally slides in the combustion chamber 4a and rotates a crankshaft via a connecting rod.

The injectors 5 are controlled by an engine control unit (ECU) 20. The ECU 20 is a control unit that controls operation of each unit of the engine 1.

The engine 1 includes an exhaust manifold 7, an exhaust pipe 8, and an exhaust gas purification device 9 as members of an exhaust system.

The exhaust manifold 7 collects gas (exhaust gas) generated in the plurality of combustion chambers 4a. The exhaust manifold 7 is provided with an exhaust manifold temperature sensor 7a. The exhaust manifold temperature sensor 7a senses the temperature (approximate to the temperature of exhaust gas in the exhaust manifold 7) of the exhaust manifold 7. Temperature information sensed by the exhaust manifold temperature sensor 7a is output to the ECU 20.

Part of gas having passed through the exhaust manifold 7 is supplied to a later-described exhaust gas recirculation (EGR) device 10, and the remaining gas is supplied to the exhaust gas purification device 9 via the exhaust pipe 8.

The exhaust gas purification device 9 is a device that purifies and discharges exhaust gas, and is also called a diesel particulate filter (DPF). The exhaust gas purification device 9 includes an oxidation catalyst 9a and a filter 9b. The oxidation catalyst 9a is a catalyst for oxidizing (combusting) uncombusted fuel, carbon monoxide, nitrogen monoxide, and the like contained in exhaust gas, and is made of, e.g., platinum. The filter 9b is configured as, for example, a wall flow type filter, and collects a particulate matter (PM) contained in exhaust gas treated with the oxidation catalyst 9a.

The engine 1 of the present embodiment includes the EGR device 10. The EGR device 10 is an exhaust gas recirculation device that recirculates part of exhaust gas discharged from the cylinder head 4 as EGR gas to the intake pipe 2 that supplies gas to the cylinder head 4. The EGR device 10 includes an EGR pipe 11, an EGR cooler 12, and an EGR valve 13.

The EGR cooler 12 cools exhaust gas (EGR gas) supplied from the exhaust manifold 7 via the EGR pipe 11. The EGR valve 13 changes the amount of EGR gas supplied from the EGR cooler 12 to the intake pipe 2. That is, the EGR valve 13 adjusts the recirculation amount of EGR gas supplied from the EGR cooler 12 to the intake pipe 2. By mixing exhaust gas with gas to be sucked into the intake manifold 3, the amount of oxygen in the gas to be sucked is reduced so that a combustion temperature can be lowered. This makes it possible to reduce generation of nitrogen oxide called NOx and to reduce emission of NOx contained in exhaust gas to external environment (NOx emission).

The EGR device 10 further has an EGR gas temperature detection sensor 14 and a valve position sensor 15. The EGR gas temperature detection sensor 14 senses the temperature of EGR gas flowing in the EGR valve 13.

The valve position sensor 15 senses the position of the EGR valve 13. For example, in a configuration in which the opening degree of the EGR valve 13 (recirculation amount of EGR gas) is adjusted by moving the EGR valve 13 in parallel in one direction, the valve position sensor 15 senses the position (initial position) of the EGR valve 13 at the time of starting the engine as the number of initialization steps. As deposits (e.g., soot) are accumulated in the EGR valve 13, the number of initialization steps changes (e.g., increases). Thus, the valve position sensor 15 senses the initial position (number of initialization steps) of the EGR valve 13 and outputs a sensing result (sensing signal) to the ECU 20, whereby the ECU 20 can recognize, based on the sensing signal, the accumulation amount of deposits adhering to the EGR valve 13.

As shown in FIG. 2, the engine 1 further includes an engine speed sensor 16. The engine speed sensor 16 detects the rotation speed of the crankshaft of the engine 1 as the rotation speed (actual rotation speed) of the engine 1. Information on the engine speed detected by the engine speed sensor 16 is output to the ECU 20. Accordingly, the ECU 20 can recognize the operation state of the engine 1 based on the engine speed. For example, the ECU 20 can recognize, based on the engine speed, whether the engine 1 is stopped, started (in cranking), or operated normally.

The engine 1 further includes an accelerator position sensor 17. The accelerator position sensor 17 includes, for example, an accelerator pedal position sensor. The accelerator pedal position sensor senses the position of an accelerator pedal, .i.e., an accelerator pedal stepping amount, as an accelerator position. Information on the accelerator position sensed by the accelerator position sensor 17 is output to the ECU 20. Accordingly, the ECU 20 can recognize the target rotation speed of the engine 1 based on the accelerator position. That is, the target rotation speed of the engine 1 is determined according to the accelerator position.

In the present embodiment, the ECU 20 selects a predetermined control mode from a plurality of control modes according to at least the engine speed (actual rotation speed) and a fuel injection amount, and controls the EGR valve 13 in the selected control mode. Here, the fuel injection amount is the injection amount (target injection amount) of fuel for achieving the target rotation speed of the engine 1. The ECU 20 performs feedback control for adjusting the target injection amount such that the engine speed approaches the target rotation speed. In addition, the ECU 20 has, as a map, a relationship among the fuel injection amount, a power distribution time for the injector 5, and a common rail pressure, and this map is calibrated after measurement of an actual fuel injection amount. Thus, the target injection amount can be equated with the actual fuel injection amount.

In addition to a function of controlling the EGR valve 13, the ECU 20 has the function of a timing unit that measures time and the function of a storage unit that stores a control program of the ECU 20, various maps, or the like.

[2. Control of EGR Valve]

Figure 3:
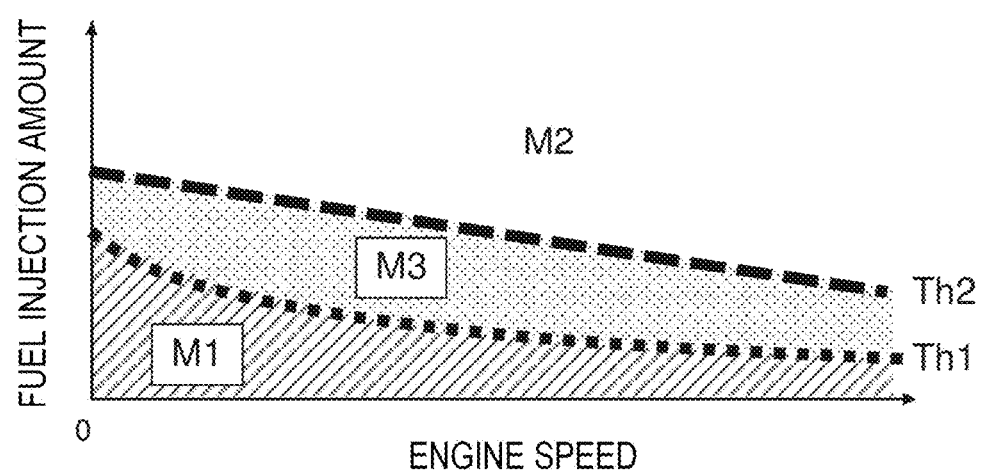
FIG. 3 is a graph schematically showing thresholds set for a fuel injection amount according to an engine speed.

Hereinafter, control of the EGR valve 13 by the ECU 20 will be described in detail. FIG. 3 schematically shows thresholds set for the fuel injection amount according to the engine speed. Here, the thresholds for the fuel injection amount are set as a first threshold Th1 and a second threshold Th2 in ascending order. That is, Th1<Th2 is satisfied at the same engine speed. As shown in this figure, both the first threshold Th1 and the second threshold Th2 change according to the engine speed. Specifically, the first threshold Th1 and the second threshold Th2 decrease as the engine speed increases. Note that the change in the first threshold Th1 and the second threshold Th2 as shown in FIG. 3 is one example and the present invention is not limited thereto.

In the present embodiment, the control modes of the EGR valve 13 include three control modes of a first mode M1, a second mode M2, and a third mode M3.

The first mode M1 is a control mode in which the EGR valve 13 is fully closed. When the ECU 20 selects the first mode M1 and controls the EGR valve 13, the EGR valve 13 is fully closed so that accumulation of deposits on the EGR valve 13 can be reduced.

The second mode M2 is a control mode in which the opening degree of the EGR valve 13 is adjusted according to the operation state of the engine 1, and is the same as normal control performed in operation of the engine 1. When the ECU 20 selects the second mode M2 and controls the EGR valve 13, the opening degree of the EGR valve 13 is adjusted according to the operation state of the engine 1 so that generation of NOx contained in exhaust gas can be reduced and NOx emission can be reduced.

Figure 4:
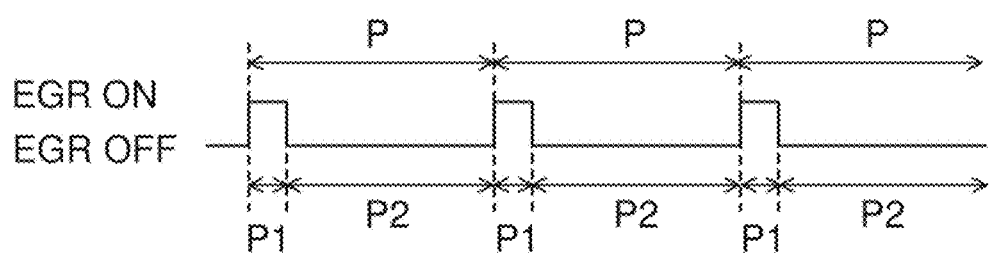
FIG. 4 is a chart for describing details of a third mode which is one of control modes of an EGR valve.

FIG. 4 is a chart describing details of the third mode M3. The third mode M3 is a control mode in which an ON period P1 and an OFF period P2 are repeated at a predetermined ratio. Here, the ON period P1 is a period in which the opening degree of the EGR valve 13 is adjusted according to the operation state of the engine 1. On the other hand, the OFF period P2 is a period in which the EGR valve 13 is fully closed. As shown in this figure, in the third mode M3, the ON period P1 and the OFF period P2 are repeated in a predetermined cycle P. Note that the opening degree of the EGR valve 13 is adjusted according to the operation state of the engine 1 in the ON period P1, and therefore, the EGR valve 13 is not necessarily fully opened (the opening degree reaches 100%). A ratio between the ON period P1 and the OFF period P2 in one cycle P will also be referred to as a "duty ratio."

When the ECU 20 selects the third mode M3 and controls the EGR valve 13, the EGR valve 13 is fully closed in the OFF period P2 to reduce accumulation of deposits on the EGR valve 13, and is opened in the ON period P1 to reduce NOx emission. That is, it is possible not only to reduce accumulation of deposits on the EGR valve 13, but also to reduce NOx emission.

Figure 5:
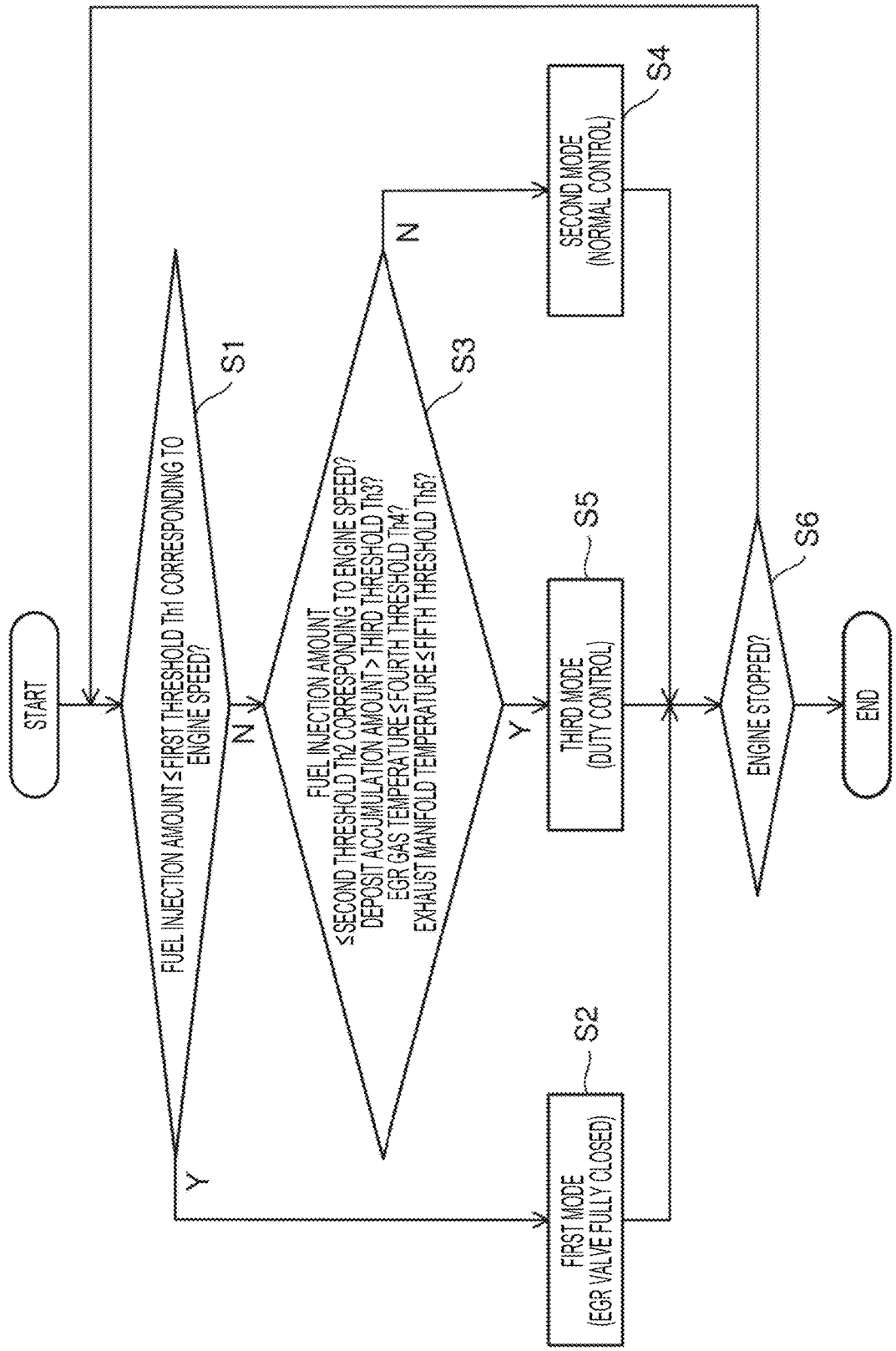
FIG. 5 is a flowchart showing the flow of an operation of controlling the EGR valve.

FIG. 5 is a flowchart showing the flow of an operation of controlling the EGR valve 13. Hereinafter, the operation of controlling the EGR valve 13 will be described with reference to FIGS. 1 to 5. Note that hereinafter, the target injection amount corresponding to the target rotation speed of the engine 1 recognized by the ECU 20 based on the accelerator position sensed by the accelerator position sensor 17 is taken as the actual fuel injection amount and will be simply referred to as "fuel injection amount." Moreover, the rotation speed of the engine 1 detected by the engine speed sensor 16 will be simply referred to as "engine speed."

First, the ECU 20 determines whether or not the fuel injection amount is equal to or less than the first threshold Th1 (hereinafter simply referred to as a "first threshold Th1") corresponding to the engine speed (S1). In a case where the fuel injection amount is equal to or less than the first threshold Th1 (Yes in S1), the ECU 20 selects the first mode M1 as the control mode, and controls the EGR valve 13 in the first mode M1 (S2).

On the other hand, in a case where the fuel injection amount is greater than the first threshold Th1 in S1 (No in S1), the ECU 20 determines whether or not the fuel injection amount is equal to or less than the second threshold Th2 (hereinafter simply referred to as a "second threshold Th2") corresponding to the engine speed (S3). At the same time, in S3, the ECU 20 determines whether or not the accumulation amount of deposits on the EGR valve 13 is greater than the third threshold Th3. Note that as described above, the accumulation amount can be recognized by the ECU 20 based on the number of initialization steps sensed by the valve position sensor 15. Further, in S3, the ECU 20 determines whether or not the temperature of EGR gas sensed by the EGR gas temperature detection sensor 14 is equal to or lower than a fourth threshold Th4, and determines whether or not the temperature of the exhaust manifold 7 sensed by the exhaust manifold temperature sensor 7a is equal to or lower than a fifth threshold Th5.

In the case of No in S3, .i.e., a case where the fuel injection amount is, for example, greater than the second threshold Th2, the ECU 20 selects the second mode M2 as the control mode, and controls the EGR valve 13 in the second mode M2 (S4). The ECU 20 selects the second mode M2 as the control mode and controls the EGR valve 13 in the second mode M2 in any of a case where the deposit accumulation amount is equal to or less than the third threshold Th3, a case where the temperature of EGR gas is higher than the fourth threshold Th4, and a case where the temperature of the exhaust manifold 7 is higher than the fifth threshold Th5 (S4).

In the case of Yes in S3, .i.e., a case where the fuel injection amount is, for example, equal to or less than the second threshold Th2, the ECU 20 selects the third mode M3 as the control mode, and controls the EGR valve 13 in the third mode M3 (S5). The ECU 20 selects the third mode M3 as the control mode and controls the EGR valve 13 in the third mode M3 in any of a case where the deposit accumulation amount is greater than the third threshold Th3, a case where the temperature of EGR gas is equal to or lower than the fourth threshold Th4, and a case where the temperature of the exhaust manifold 7 is equal to or lower than the fifth threshold Th5 (S5).

Then, the ECU 20 repeats, based on the engine speed, the processing after S1 until the engine 1 is stopped (S6), and when the engine 1 is stopped, a series of processing (control) ends.

As described above, the ECU 20 as a control unit selects the predetermined control mode from the first mode M1, the second mode M2, and the third mode M3 according to at least the engine speed and the fuel injection amount, and controls the EGR valve 13 in the selected control mode.

Since the control modes for the EGR valve 13 includes the third mode M3 in addition to the first mode M1 and the second mode M2, the ECU 20 can select the third mode M3 to control the EGR valve 13 in a case where a risk of accumulating deposits on the EGR valve 13 is low, such as a case where the fuel injection amount is greater than the first threshold Th1 and equal to or less than the second threshold Th2 (No in S1, Yes in S3). Since the EGR valve 13 is opened only during the ON period P1 in the third mode M3, NOx contained in exhaust gas discharged from the cylinder head 4 can be reduced, for example, as compared to a case where the EGR valve 13 is controlled in the first mode M1 (as compared to a case where the EGR valve 13 is fully closed). Thus, in a case where the risk of accumulating deposits on the EGR valve 13 is low, the EGR valve 13 is controlled, by selecting the third mode M3, to be opened as much as possible, and NOx emission can be reduced as much as possible.

In a case where the fuel injection amount is equal to or less than the first threshold Th1 (Yes in S1), the risk of accumulating deposits on the EGR valve 13 is assumed to be high. In this case, accumulation of deposits on the EGR valve 13 is preferably reduced by fully closing the EGR valve 13. From such a point of view, the ECU 20 preferably selects the first mode M1 as the control mode in a case where the fuel injection amount is equal to or less than the first threshold Th1 (S1, S2).

In a case where the fuel injection amount is greater than the second threshold Th2 (No in S3), the ECU 20 preferably selects the second mode M2 as the control mode in order to reduce NOx emission (S4).

On the other hand, in a case where the fuel injection amount is greater than the first threshold Th1 and equal to or less than the second threshold Th2, the risk of accumulating deposits on the EGR valve 13 is assumed to be low. In this case, in order to reduce NOx emission by opening the EGR valve 13 as much as possible while reducing accumulation of deposits on the EGR valve 13, the ECU 20 preferably selects the third mode M3 as the control mode (S3, S5).

In a case where the fuel injection amount is greater than the first threshold Th1 and equal to or less than the second threshold Th2 (S3), the risk of accumulating deposits on the EGR valve 13 is assumed to be low as described above. However, when an actual deposit accumulation amount is great, there is a probability that the opening degree of the EGR valve 13 cannot be properly adjusted to the opening degree according to the operation state of the engine 1 due to accumulated deposits. For this reason, when the third mode M3 is selected in S5 based on determination in S3, the actual accumulation amount of deposits on the EGR valve 13 is preferably taken into consideration in determination in S3. That is, the ECU 20 preferably selects the third mode M3 as the control mode in a case where the accumulation amount of deposits on the EGR valve 13, which is obtained based on the initial position of the EGR valve 13, is greater than the third threshold Th3 (S3, S5).

On the other hand, in a case where the deposit accumulation amount is equal to or less than the third threshold Th3 in S3, the ECU 20 preferably selects the second mode M2 as the control mode in order to reduce NOx emission (in preference to reduction in deposit accumulation on the EGR valve 13) (S4).

In a case where the fuel injection amount is greater than the first threshold Th1 and equal to or less than the second threshold Th2 (S3), at a low EGR gas temperature, the risk of accumulating deposits on the EGR valve 13 is high, and there is a probability that the opening degree of the EGR valve 13 cannot be properly adjusted to the opening degree according to the operation state of the engine 1 due to accumulated deposits. For this reason, when the third mode M3 is selected in S5 based on determination in S3, the temperature of EGR gas is preferably taken into consideration in determination in S3. That is, the ECU 20 preferably selects the third mode M3 as the control mode in a case where the temperature of EGR gas is equal to or lower than the fourth threshold Th4 (S3, S5).

On the other hand, in a case where the temperature of EGR gas is higher than the fourth threshold Th4 in S3, the risk of accumulating deposits on the EGR valve 13 is assumed to be low. In this case, the ECU 20 preferably selects the second mode M2 as the control mode in order to reduce NOx emission (in preference to reduction in deposit accumulation on the EGR valve 13) (S4).

In a case where the fuel injection amount is greater than the first threshold Th1 and equal to or less than the second threshold Th2 (S3), if the temperature of the exhaust manifold 7 (the temperature of exhaust gas) that discharges exhaust gas from the cylinder head 4 is low, the risk of accumulating deposits on the EGR valve 13 through which part of the exhaust gas passes as EGR gas increases because a large amount of uncombusted components is included in the exhaust gas. As a result, due to the accumulated deposits, there is a probability that the opening degree of the EGR valve 13 cannot be properly adjusted to the opening degree according to the operation state of the engine 1. For this reason, when the third mode M3 is selected in S5 based on determination in S3, the temperature of the exhaust manifold 7 is preferably taken into consideration in determination in S3. That is, the ECU 20 preferably selects the third mode M3 as the control mode in a case where the temperature of the exhaust manifold 7 is equal to or lower than the fifth threshold Th5 (S3, S5).

On the other hand, in a case where the temperature of the exhaust manifold 7 is higher than the fifth threshold Th5 in S3, the risk of accumulating deposits on the EGR valve 13 is assumed to be low. In this case, the ECU 20 preferably selects the second mode M2 as the control mode in order to reduce NOx emission (in preference to reduction in deposit accumulation on the EGR valve 13) (S4).

[3. Adjustment of Duty Ratio in Third Mode]

Figure 6:
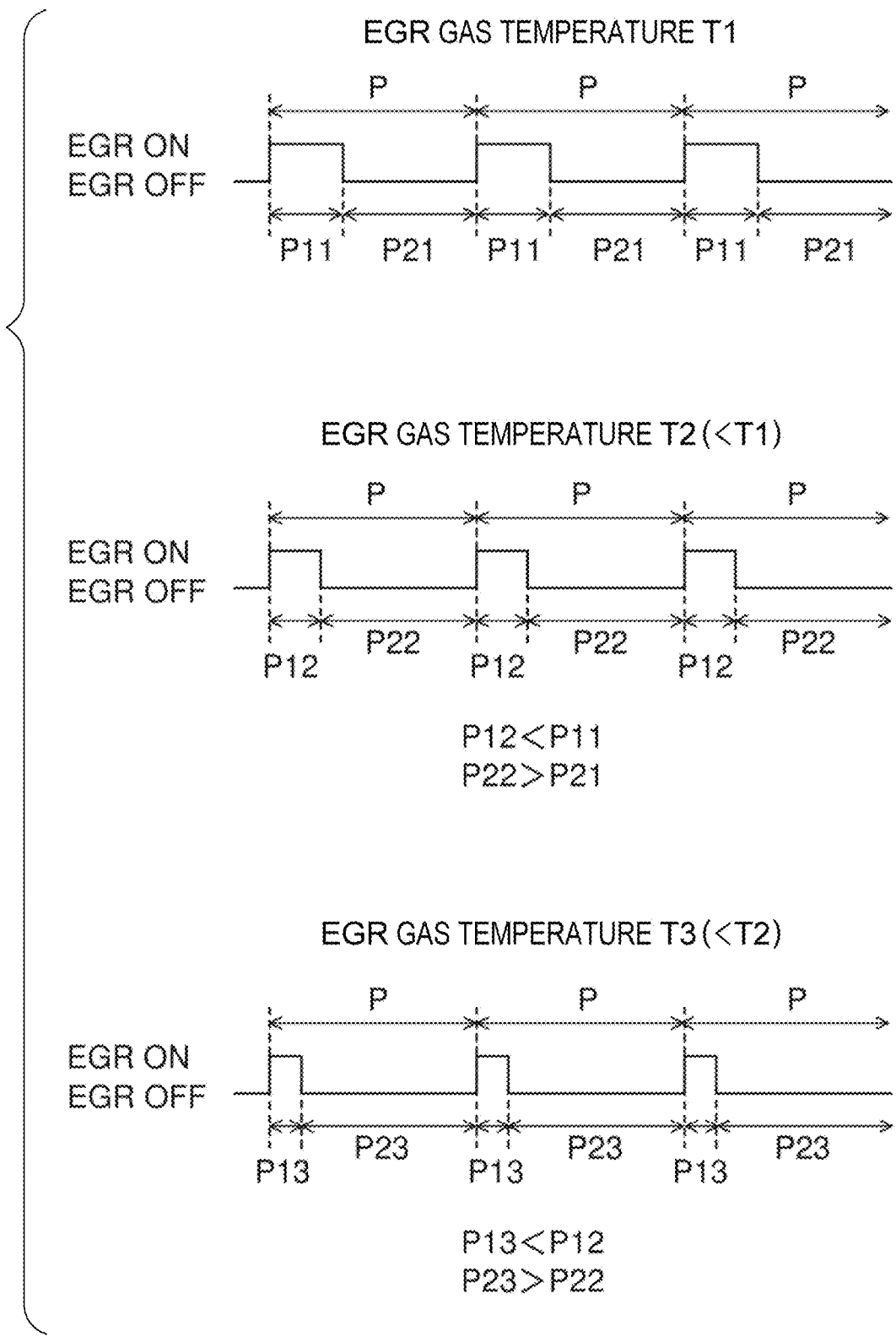
FIG. 6 is a schematic chart describing a relationship between the temperature of EGR gas and a duty ratio in a case where the EGR valve is controlled in the third mode.

FIG. 6 schematically shows a relationship between the temperature of EGR gas and the duty ratio (ratio between the ON period and the OFF period) in a case where the EGR valve 13 is controlled in the third mode M3. Here, one cycle P (sec) which is the repeating unit of the ON period and the OFF period is constant. It is assumed that when the temperature of EGR gas is T1 (° C.), the ON period is P11 (sec) and the OFF period is P21 (sec). It is assumed that when the temperature of EGR gas is T2 (° C.), which is lower than T1 (° C.), the ON period is P12 (sec) and the OFF period is P22 (sec). It is assumed that when the temperature of EGR gas is T3 (° C.), which is lower than T2 (° C.), the ON period is P13 (sec) and the OFF period is P23 (sec).

Figure 7:
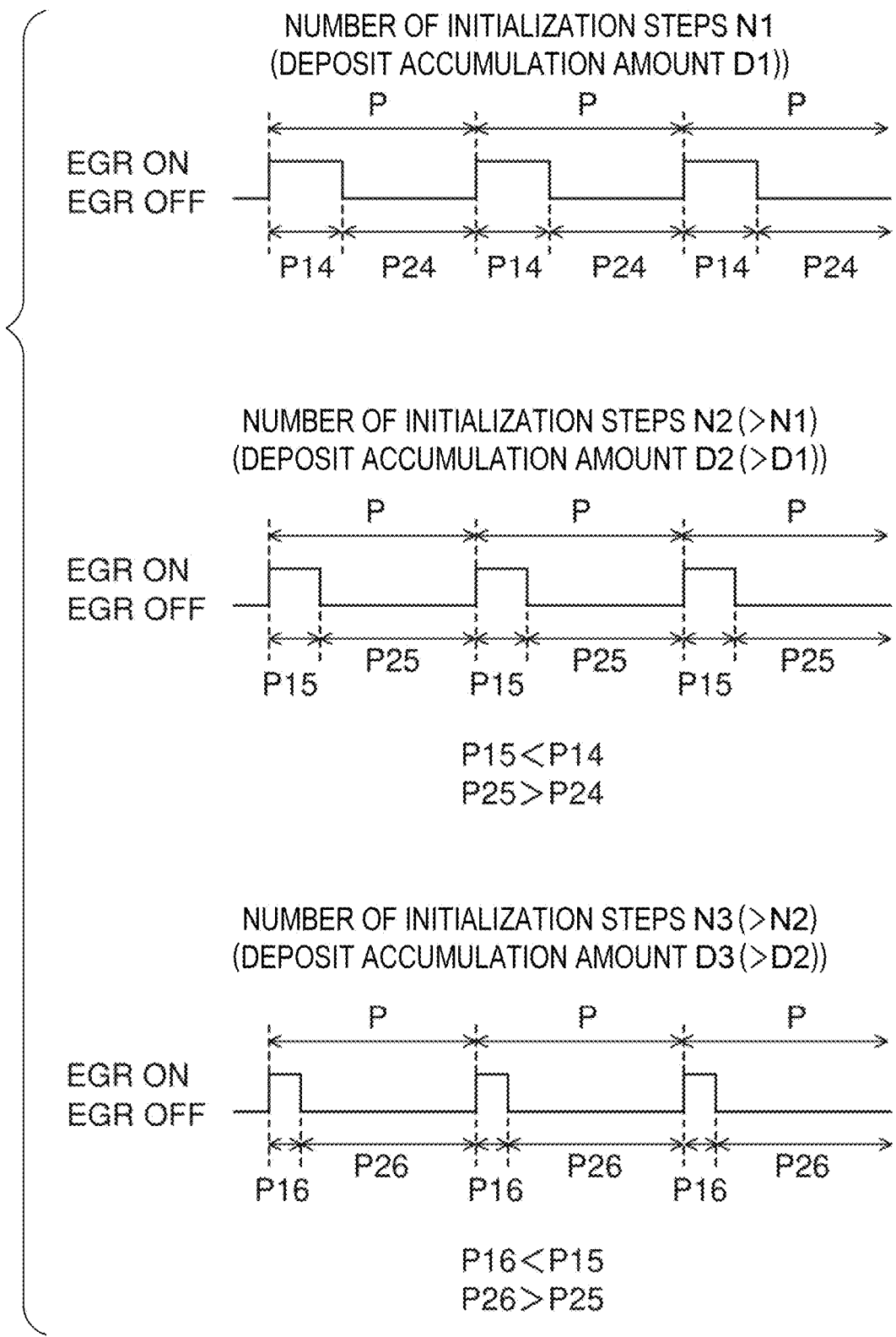
FIG. 7 is a schematic chart describing a relationship between the number of initialization steps and the duty ratio in a case where the EGR valve is controlled in the third mode.

In the third mode, the ON period is preferably ensured to open the EGR valve 13 as much as possible in order to reduce NOx emission. However, when the EGR valve 13 is opened, deposits are more likely to be accumulated on the EGR valve 13 (the risk of accumulation increases) as the EGR gas temperature decreases. Thus, in the present embodiment, in a case where the temperature of EGR gas changes in the order of T1, T2 (<T1), and T3 (<T2), the OFF period in one cycle P changes in the order of P21, P22 (>P21), and P23 (>P22). That is, in order to reduce accumulation of deposits on the EGR valve 13 in consideration of the temperature of EGR gas, the ECU 20 preferably extends the OFF period in one cycle P in the third mode as the EGR gas temperature decreases FIG. 7 schematically shows a relationship between the number of initialization steps indicating the initial position of the EGR valve 13 and the duty ratio in a case where the EGR valve 13 is controlled in the third mode M3. As in the case of FIG. 6, one cycle P (sec) which is the repeating unit of the ON period and the OFF period is constant. It is assumed that when the number of initialization steps is N1 (step), the ON period is P14 (sec) and the OFF period is P24 (sec). It is assumed that when the number of initialization steps is N2 (step), which is greater than N1, the ON period is P15 (sec) and the OFF period is P25 (sec). It is assumed that when the number of initialization steps is N3 (step), which is greater than N2, the ON period is P16 (sec) and the OFF period is P26 (sec). Note that the accumulation amounts of deposits on the EGR valve 13 recognized by the ECU 20 when the number of initialization steps is N1, N2, and N3 are denoted by D1 (mm), D2 (mm), and D3 (mm), respectively. Note that D1<D2<D3 is satisfied because of N1<N2<N3.

In the third mode, the ON period is preferably ensured to open the EGR valve 13 as much as possible in order to reduce NOx emission. However, when the EGR valve 13 is opened, deposits are likely to be accumulated on the EGR valve 13. As the accumulation amount of deposits on the EGR valve 13 increases, there is a probability that due to the accumulated deposits, the opening degree of the EGR valve 13 cannot be properly adjusted to the opening degree according to the operation state of the engine 1. For this reason, in the present embodiment, in a case where the number of initialization steps changes in the order of N1, N2 (>N1), and N3 (>N2), .i.e., a case where the deposit accumulation amount changes in the order of D1, D2 (>D1), and D3 (>D2), the OFF period in one cycle P is changed in the order of P24, P25 (>P24), and P26 (>P25). That is, in order to properly adjust the opening degree of the EGR valve 13 in consideration of the deposit accumulation amount, the ECU 20 preferably extends the OFF period in one cycle P in the third mode as the deposit accumulation amount increases.

[4. Adjustment of Thresholds]

Figure 8:
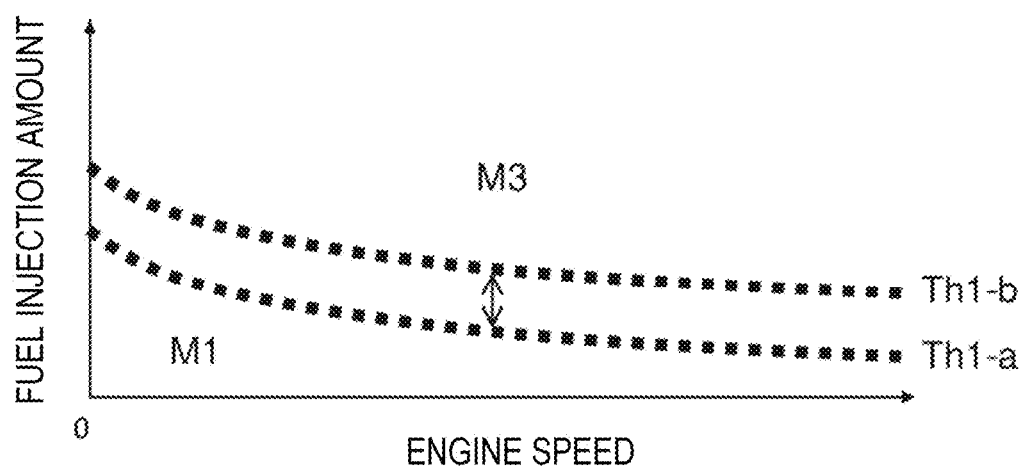
FIG. 8 is a graph schematically showing a change in a first threshold due to transition of the control mode.

FIG. 8 schematically shows a change in the first threshold Th1 due to transition of the control mode. The ECU 20 preferably shifts the first threshold Th1 in a (fuel injection amount) increasing direction after having selected the first mode M1 as the control mode. For example, when the first threshold Th1 before the shift is Th1-$a$, the first threshold after the shift is Th1-$b$. Note that the shift amount from Th1-$a$ to Th1-$b$ can be set as necessary.

When the first threshold Th1 is adjusted in this manner, for example, even in a case where the control mode transitions from the third mode M3 to the first mode M1 and the first threshold Th1 subsequently changes in the fuel injection amount increasing direction, the control mode is less likely to transition from the first mode M1 to the third mode M3 in a short period of time (because the first threshold Th1 substantially increases). That is, a probability of the control mode being switched in a short period of time is reduced. This reduces a probability of control of the EGR valve 13 being complicated.

The ECU 20 preferably shifts the first threshold Th1 in a (fuel injection amount) decreasing direction after having selected the third mode M3 as the control mode. For example, when the first threshold Th1 before the shift is Th1-$b$, the first threshold after the shift is Th1-$a$.

When the first threshold Th1 is adjusted in this manner, for example, even in a case where the control mode transitions from the first mode M1 to the third mode M3 and the first threshold Th1 subsequently changes in the fuel injection amount decreasing direction, the control mode is less likely to transition from the third mode M3 to the first mode M1 in a short period of time (because the first threshold Th1 substantially decreases). That is, a probability of the control mode being switched in a short period of time is reduced. This reduces a probability of control of the EGR valve 13 being complicated.

Figure 9:
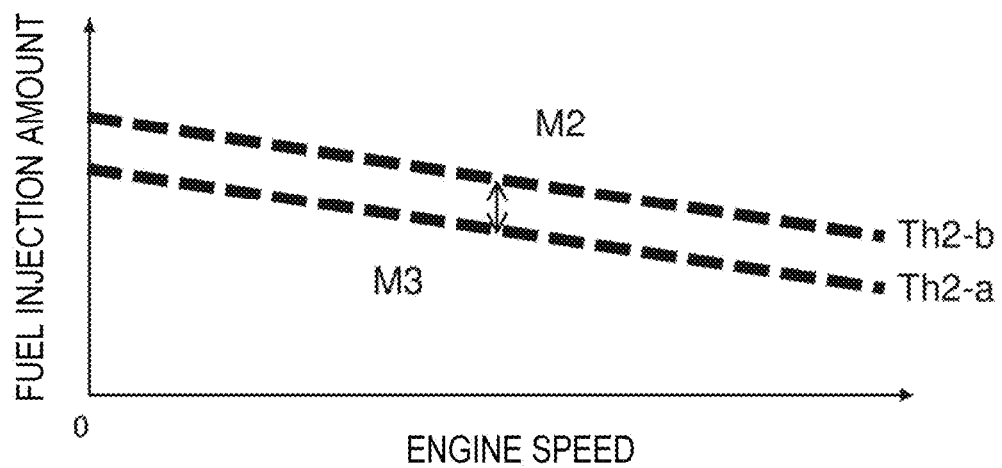
FIG. 9 is a graph schematically showing a change in a second threshold due to transition of the control mode.

FIG. 9 schematically shows a change in the second threshold Th2 due to transition of the control mode. The ECU 20 preferably shifts the second threshold Th2 in a (fuel injection amount) increasing direction after having selected the third mode M3 as the control mode. For example, when the second threshold Th2 before the shift is Th2-$a$, the second threshold after the shift is Th2-$b$. Note that the shift amount from Th2-$a$ to Th2-$b$ can be set as necessary.

When the second threshold Th2 is adjusted in this manner, for example, even in a case where the control mode transitions from the second mode M2 to the third mode M3 and the second threshold Th2 subsequently changes in the fuel injection amount increasing direction, the control mode is less likely to transition from the third mode M3 to the second mode M2 in a short period of time (because the second threshold Th2 substantially increases). That is, a probability of the control mode being switched in a short period of time is reduced. This reduces a probability of control of the EGR valve 13 being complicated.

The ECU 20 preferably shifts the second threshold Th2 in a (fuel injection amount) decreasing direction after having selected the second mode M2 as the control mode. For example, when the second threshold Th2 before the shift is Th2-$b$, the second threshold after the shift is Th2-$a$.

When the second threshold Th2 is adjusted in this manner, for example, even in a case where the control mode transitions from the third mode M3 to the second mode M2 and the second threshold Th2 subsequently changes in the fuel injection amount decreasing direction, the control mode is less likely to transition from the second mode M2 to the third mode M3 in a short period of time (because the second threshold Th2 substantially decreases). That is, a probability of the control mode being switched in a short period of time is reduced. This reduces a probability of control of the EGR valve 13 being complicated.

[5. Supplement]

The example where the control modes of the EGR valve 13 include the three control modes of the first mode M1, the second mode M2, and the third mode M3 has been described above, but four or more control modes may be provided. The ECU 20 may select any of the first mode M1, the second mode M2, and the third mode M3 from the four or more control modes according to at least the engine speed and the fuel injection amount, and control the EGR valve 13 in the selected control mode. Thus, for example, a fourth mode in which the EGR valve 13 is fully opened may be included in the plurality of control modes of the EGR valve 13.

The third threshold Th3 used in determination in S3 of FIG. 5, .i.e., the third threshold Th3 to be compared with the accumulation amount of deposits on the EGR valve 13, may vary according to the operation time of the engine 1. For example, the third threshold Th3 may increase as the operation time of the engine 1 increases. It is assumed that the accumulation amount of deposits on the EGR valve 13 increases as the operation time of the engine 1 increases. Thus, by increasing the third threshold Th3, the control mode is less likely to transition to the second mode M2 (normal control). In other words, it is possible to perform a control of prioritizing, over the second mode M2, the third mode M3 having the OFF period in which the EGR valve 13 is fully closed.

In S3 of FIG. 5, instead of the condition for comparing the accumulation amount of deposits on the EGR valve 13 with the third threshold Th3, a condition for comparing the operation time of the engine 1 with another threshold may be employed. It is assumed that the accumulation amount of deposits on the EGR valve 13 increases as the operation time of the engine 1 increases. Thus, it is assumed that even by comparing the operating time of the engine 1 with the another threshold, it is possible, depending on the setting of the threshold, to obtain a result equivalent to that in a case of comparing the deposit accumulation amount with the third threshold Th3.

[6. Additional Remarks]

The engine described in the present embodiment can be expressed as in the following additional remarks.

An engine according to Additional Remark (1) is an engine including an EGR device that recirculates part of exhaust gas discharged from a cylinder head as EGR gas to an intake pipe that supplies gas to the cylinder head, and the EGR device includes an EGR valve that adjusts the recirculation amount of the EGR gas. The engine further includes a control unit that controls the EGR valve.

The control unit selects a predetermined control mode from at least a first mode, a second mode, and a third mode according to at least an engine speed and a fuel injection amount, and controls the EGR valve in the selected control mode.

The first mode is a control mode in which the EGR valve is fully closed.

The second mode is a control mode in which the opening degree of the EGR valve is adjusted according to the operation state of the engine.

The third mode is a control mode in which an ON period in which the opening degree of the EGR valve is adjusted according to the operation state of the engine and an OFF period in which the EGR valve is fully closed are repeated (at a predetermined ratio).

An engine according to Additional Remark (2) is the engine according to Additional Remark (1), in which:

when two types of thresholds set for the fuel injection amount in advance according to the engine speed are set as a first threshold and a second threshold in ascending order; and the control unit selects the first mode as the control mode in a case where the fuel injection amount is equal to or less than the first threshold corresponding to the engine speed, selects the second mode as the control mode in a case where the fuel injection amount is greater than the second threshold corresponding to the engine speed, and selects the third mode as the control mode in a case where the fuel injection amount is greater than the first threshold corresponding to the engine speed and equal to or less than the second threshold corresponding to the engine speed.

An engine according to Additional Remark (3) is the engine according to Additional Remark (2), in which:

in a case where the fuel injection amount is greater than the first threshold corresponding to the engine speed, the control unit selects the third mode as the control mode when the fuel injection amount is equal to or less than the second threshold corresponding to the engine speed and the accumulation amount of deposits on the EGR valve, which is obtained based on the initial position of the EGR valve, is greater than a third threshold, and selects the second mode as the control mode when the accumulation amount is equal to or less than the third threshold.

An engine according to Additional Remark (4) is the engine according to Additional Remark (2) or (3), in which:

in a case where the fuel injection amount is greater than the first threshold corresponding to the engine speed, the control unit selects the third mode as the control mode when the fuel injection amount is equal to or less than the second threshold corresponding to the engine speed and the temperature of the EGR gas is equal to or lower than a fourth threshold, and selects the second mode as the control mode when the temperature of the EGR gas is higher than the fourth threshold.

An engine according to Additional Remark (5) is the engine according to any one of Additional Remarks (2) to (4), in which:

in a case where the fuel injection amount is greater than the first threshold corresponding to the engine speed, the control unit selects the third mode as the control mode when the fuel injection amount is equal to or less than the second threshold corresponding to the engine speed and the temperature of an exhaust manifold that discharges the exhaust gas from the cylinder head is equal to or lower than a fifth threshold, and selects the second mode as the control mode when the temperature of the exhaust manifold is higher than the fifth threshold.

An engine according to Additional Remark (6) is the engine according to any one of Additional Remarks (2) to (5), in which:

the control unit shifts the first threshold in an increasing direction after having selected the first mode.

An engine according to Additional Remark (7) is the engine according to any one of Additional Remarks (2) to (6), in which:

the control unit shifts the first threshold in a decreasing direction after having selected the third mode.

An engine according to Additional Remark (8) is the engine according to any one of Additional Remarks (2) to (7), in which:

the control unit shifts the second threshold in an increasing direction after having selected the third mode.

An engine according to Additional Remark (9) is the engine according to any one of Additional Remarks (2) to (8), in which:

the control unit shifts the second threshold in a decreasing direction after having selected the second mode.

An engine according to Additional Remark (10) is the engine according to any one of Additional Remarks (1) to (9), in which:

in the third mode, the control unit extends the OFF period in one cycle, which is the repeating unit of the ON period and the OFF period, as the temperature of the EGR gas decreases.

An engine according to Additional Remark (11) is the engine according to any one of Additional Remarks (1) to (10), in which:

in the third mode, the control unit extends the OFF period in one cycle, which is the repeating unit of the ON period and the OFF period, as the accumulation amount of deposits on the EGR valve, which is obtained based on the initial position of the EGR valve, increases.

Although the embodiment of the present invention has been described above, the scope of the present invention is not limited thereto and can be expanded or changed without departing from the gist of the invention.

INDUSTRIAL APPLICABILITY

The present invention is applicable to a work vehicle such as a tractor.

LIST OF REFERENCE SIGNS

1 Engine
2 Intake Pipe
4 Cylinder Head
7 Exhaust Manifold
10 EGR Device
13 EGR Valve
20 ECU (Control Unit)
M1 First Mode
M2 Second Mode
M3 Third Mode
P Cycle
P1 ON Period P2 OFF Period
Th1 First Threshold
Th2 Second Threshold
Th3 Third Threshold
Th4 Fourth Threshold
Th5 Fifth Threshold

The invention claimed is:

1. An engine including an EGR device that recirculates part of exhaust gas discharged from a cylinder head as EGR gas to an intake pipe that supplies gas to the cylinder head, the EGR device including an EGR valve that adjusts a recirculation amount of the EGR gas, the engine comprising:
a control unit that controls the EGR valve, wherein:
the control unit selects a predetermined control mode from at least a first mode, a second mode, and a third mode according to an operation state of the engine, wherein the operation state includes at least an engine speed and a fuel injection amount, and controls the EGR valve in the selected control mode,
the first mode is a control mode in which the EGR valve is fully closed,
the second mode is a control mode in which an opening degree of the EGR valve is adjusted according to the operation state of the engine, and
the third mode is a control mode in which an ON period, in which the opening degree of the EGR valve is adjusted according to the operation state of the engine, and an OFF period, in which the EGR valve is fully closed, are repeatedly alternated.

2. The engine according to claim 1, wherein
when two types of thresholds set for the fuel injection amount in advance according to the engine speed are set as a first threshold and a second threshold in ascending order, and
the control unit
selects the first mode as the control mode in a case where the fuel injection amount is equal to or less than the first threshold corresponding to the engine speed,
selects the second mode as the control mode in a case where the fuel injection amount is greater than the second threshold corresponding to the engine speed, and
selects the third mode as the control mode in a case where the fuel injection amount is greater than the first threshold corresponding to the engine speed and equal to or less than the second threshold corresponding to the engine speed.

3. The engine according to claim 2, wherein
in a case where the fuel injection amount is greater than the first threshold corresponding to the engine speed, the control unit
selects the third mode as the control mode when the fuel injection amount is equal to or less than the second threshold corresponding to the engine speed and an accumulation amount of a deposit on the EGR valve, which is obtained based on an initial position of the EGR valve, is greater than a third threshold, and
selects the second mode as the control mode when the accumulation amount is equal to or less than the third threshold.

4. The engine according to claim 2, wherein
in a case where the fuel injection amount is greater than the first threshold corresponding to the engine speed, the control unit
selects the third mode as the control mode when the fuel injection amount is equal to or less than the second threshold corresponding to the engine speed and a temperature of the EGR gas is equal to or lower than a fourth threshold, and
selects the second mode as the control mode when the temperature of the EGR gas is higher than the fourth threshold.

5. The engine according to claim 2, wherein
in a case where the fuel injection amount is greater than the first threshold corresponding to the engine speed, the control unit
selects the third mode as the control mode when the fuel injection amount is equal to or less than the second threshold corresponding to the engine speed and a temperature of an exhaust manifold that discharges the exhaust gas from the cylinder head is equal to or lower than a fifth threshold, and
selects the second mode as the control mode when the temperature of the exhaust manifold is higher than the fifth threshold.

6. The engine according to claim 2, wherein
the control unit shifts the first threshold in an increasing direction after having selected the first mode.

7. The engine according to claim 2, wherein
the control unit shifts the first threshold in a decreasing direction after having selected the third mode.

8. The engine according to claim 2, wherein
the control unit shifts the second threshold in an increasing direction after having selected the third mode.

9. The engine according to claim 2, wherein
the control unit shifts the second threshold in a decreasing direction after having selected the second mode.

10. The engine according to claim 1, wherein
in the third mode, the control unit extends the OFF period in one cycle, which is a repeating unit of the ON period and the OFF period, as a temperature of the EGR gas decreases.

11. The engine according to claim 1, wherein
in the third mode, the control unit extends the OFF period in one cycle, which is a repeating unit of the ON period and the OFF period, as an accumulation amount of a deposit on the EGR valve, which is obtained based on an initial position of the EGR valve, increases.

12. An engine comprising:
an EGR device that recirculates part of an exhaust gas discharged from a cylinder head as EGR gas to an intake pipe that supplies gas to the cylinder head, the EGR device including an EGR valve that adjusts a recirculation amount of the EGR gas; and
a control unit that controls the EGR valve and is configured to select a predetermined control mode from at least a first mode, a second mode, and a third mode according to at least an engine speed and a fuel injection amount, wherein a first threshold and a second threshold are set in ascending order for the fuel injection amount according to the engine speed, wherein the control unit selects:
the first mode when the fuel injection amount is equal to or less than the first threshold,
the second mode when the fuel injection amount is greater than the second threshold, and
the third mode when the fuel injection amount is greater than the first threshold and equal to or less than the second threshold,
wherein when the control unit selects the first mode, the control unit is configured to increase the first threshold and control the EGR valve in the selected control mode, wherein the first mode is a control mode in which the EGR valve is fully closed, wherein the second mode is a control mode in which an opening degree of the EGR valve is adjusted according to an operation state of the engine, and wherein the third mode is a control mode in which an ON period in which the opening degree of the EGR valve is adjusted according to the operation state of the engine and an OFF period in which the EGR valve is fully closed are repeated.

13. An engine comprising:

an EGR device that recirculates part of an exhaust gas discharged from a cylinder head as EGR gas to an intake pipe that supplies gas to the cylinder head, the EGR device including an EGR valve that adjusts a recirculation amount of the EGR gas; and a control unit that controls the EGR valve and is configured to select a predetermined control mode from at least a first mode, a second mode, and a third mode according to at least an engine speed and a fuel injection amount, wherein a first threshold and a second threshold are set in ascending order for the fuel injection amount according to the engine speed, wherein the control unit selects:

the first mode when the fuel injection amount is equal to or less than the first threshold, the second mode when the fuel injection amount is greater than the second threshold, and the third mode when the fuel injection amount is greater than the first threshold and equal to or less than the second threshold, wherein when the control unit selects the third mode, the control unit is configured to decrease the first threshold and control the EGR valve in the selected control mode, wherein the first mode is a control mode in which the EGR valve is fully closed, wherein the second mode is a control mode in which an opening degree of the EGR valve is adjusted according to an operation state of the engine, and wherein the third mode is a control mode in which an ON period in which the opening degree of the EGR valve is adjusted according to the operation state of the engine and an OFF period in which the EGR valve is fully closed are repeated.

* * * * *